US012790875B2

(12) United States Patent
Kawai

(10) Patent No.: US 12,790,875 B2
(45) Date of Patent: Nov. 10, 2026

(54) CARRIER PLATE AND WINDOW REGULATOR

(71) Applicant: HI-LEX Corporation, Hyogo (JP)

(72) Inventor: Shingo Kawai, Hyogo (JP)

(73) Assignee: HI-LEX Corporation, Hyogo (JP)

( * ) Notice: Subject to any disclaimer, the term of this patent is extended or adjusted under 35 U.S.C. 154(b) by 0 days.

(21) Appl. No.: 18/998,548

(22) PCT Filed: Jul. 28, 2023

(86) PCT No.: PCT/JP2023/027681
§ 371 (c)(1),
(2) Date: Jan. 27, 2025

(87) PCT Pub. No.: WO2024/024921
PCT Pub. Date: Feb. 1, 2024

(65) Prior Publication Data

US 2026/0043289 A1 Feb. 12, 2026

(30) Foreign Application Priority Data

Jul. 28, 2022 (JP) ................................ 2022-120821

(51) Int. Cl.
*E05F 15/689* (2015.01)

(52) U.S. Cl.
CPC ....... *E05F 15/6914* (2024.01); *E05Y 2201/64* (2013.01); *E05Y 2201/684* (2013.01); *E05Y 2600/456* (2013.01); *E05Y 2900/55* (2013.01)

(58) Field of Classification Search
CPC ............................ E05F 11/486; E05F 15/6914
See application file for complete search history.

(56) References Cited

U.S. PATENT DOCUMENTS 4,502,247 A * 3/1985 Kobayashi ............ E05F 11/483 49/374
5,864,987 A * 2/1999 Mariel .................. E05F 11/385 49/352
5,970,658 A * 10/1999 Smith ................. E05D 13/1207 49/352
6,115,966 A * 9/2000 Shibata ................. E05F 15/689 49/374
6,751,905 B1 * 6/2004 Daumal Castellon ....................... E05F 11/486 49/352
7,617,633 B2 * 11/2009 Shimura .............. E05F 11/382 49/352
8,042,302 B2 * 10/2011 Kruger .................. E05F 11/486 49/352
8,215,060 B2 * 7/2012 Sasaki ................... E05F 11/486 49/352

(Continued)

FOREIGN PATENT DOCUMENTS

JP 07-18294 3/1995
JP 2019-112803 7/2019

*Primary Examiner* — Catherine A Kelly

(57) ABSTRACT

A carrier plate includes an elastic claw that includes a leading-end portion located, in a case where a base body is viewed along a sliding direction of the carrier plate, in a position overlapping with a rotation prevention claw in a direction orthogonal to the sliding direction and a width direction, and the leading-end portion is in contact with a flange portion to cause the leading-end portion and the rotation prevention claw to hold the flange portion therebetween.

8 Claims, 8 Drawing Sheets

(56) References Cited

U.S. PATENT DOCUMENTS

| | | | | |
|---|---|---|---|---|
| 8,720,114 | B2 * | 5/2014 | Matsushita | E05F 5/06 49/352 |
| 9,822,568 | B2 * | 11/2017 | Matsushita | E05F 11/486 |
| 10,604,981 | B2 * | 3/2020 | Shiroma | E05F 11/486 |
| 10,753,137 | B2 * | 8/2020 | Muramatsu | E05F 11/382 |
| 11,286,704 | B2 * | 3/2022 | Takaoka | E05F 11/385 |
| 11,408,217 | B2 * | 8/2022 | Kawai | E05F 15/686 |
| 11,719,031 | B2 * | 8/2023 | Murata | B60J 5/0468 49/404 |
| 11,788,336 | B2 * | 10/2023 | Kashiwagi | E05F 15/689 49/352 |
| 12,037,835 | B2 * | 7/2024 | Yamamoto | E05F 11/486 |
| 2019/0194993 | A1 | 6/2019 | Shiroma | |
| 2022/0018173 | A1 * | 1/2022 | Murata | E05F 11/382 |

* cited by examiner

CARRIER PLATE AND WINDOW REGULATOR

TECHNICAL FIELD

The present invention relates to a carrier plate and a window regulator.

BACKGROUND ART

In the related art, a window regulator that pulls a carrier plate, which holds a window glass, by a cable and causes the carrier plate to slide on a guide rail to raise and lower the window glass has been used in a vehicle.

For example, Patent Literature (hereinafter referred to as "PTL") 1 discloses a window regulator including: a driving section; a raising-side cable that pulls a carrier plate in a raising direction; a lowering-side cable that pulls the carrier plate in a lowering direction; a cable guide disposed in an upper end portion of a guide rail; and a lower-side pulley disposed in a lower end portion of the guide rail, where the raising-side cable is coupled to a drum of the driving section via the cable guide, and the lowering-side cable is coupled to the drum of the driving section.

CITATION LIST

Patent Literature

PTL 1
Japanese Patent Application Laid-Open No. 2019-112803

SUMMARY OF INVENTION

Technical Problem

However, in a case where a cable (a raising-side cable or a lowering-side cable) intrudes into a gap between a rotation prevention claw and an elastic claw for preventing rattling when a carrier plate is attached to a guide rail while the carrier plate is being rotated with respect to the guide rail, the cable cannot move from the gap and is not routed in the correct position, which may require redoing the assembly of the carrier plate and may reduce assembly workability.

An object of the present invention is to provide a carrier plate and a window regulator each capable of enhancing assembly workability in the carrier plate.

Solution to Problem

In order to achieve the object mentioned above, a carrier plate in the present invention is a carrier plate that is slidably guided on or along a guide rail by transmission of a driving force of a driving section by a cable, where the guide rail includes: a base portion; an erected portion that is erected from the base portion and is connected to the base portion at one end of the erected portion; and a flange portion that is connected to another end of the erected portion. The carrier plate includes:

- a base body;
- a fitting portion that fits with the guide rail;
- a rotation prevention claw that is provided away from the fitting portion, on one side in a width direction of the base portion, and prevents rotation of the carrier plate around the fitting portion with respect to the guide rail;

- an accommodation portion that is provided on another side in the width direction of the base portion with respect to the fitting portion, and accommodates an end portion of the cable; and
- an elastic claw that includes a leading-end portion located, in a case where the base body is viewed along a sliding direction of the carrier plate, in a position overlapping with the rotation prevention claw in a direction orthogonal to the sliding direction and the width direction, where the leading-end portion is in contact with the flange portion to cause the leading-end portion and the rotation prevention claw to hold the flange portion therebetween.

A window regulator in the present invention includes:

- the carrier plate described above;
- a guide rail that guides the carrier plate, and includes;
  - a base portion;
  - an erected portion that is erected from the base portion and is connected to the base portion at one end of the erected portion; and
  - a flange portion that is connected to another end of the erected portion;
- a cable that transmits a driving force of a driving section to the carrier plate; and
- a direction-changing member provided in an end portion of the guide rail.

The carrier plate includes:

- a base body;
- a fitting portion that fits with the guide rail;
- a rotation prevention claw that is provided away from the fitting portion, on one side in a width direction of the base portion, and prevents rotation of the carrier plate around the fitting portion with respect to the guide rail;
- an accommodation portion that is provided on another side in the width direction of the base portion with respect to the fitting portion, and accommodates an end portion of the cable; and
- an elastic claw that includes a leading-end portion located, in a case where the base body is viewed along a sliding direction of the carrier plate, in a position overlapping with the rotation prevention claw in a direction orthogonal to the sliding direction and the width direction, where the leading-end portion is in contact with the flange portion to cause the leading-end portion and the rotation prevention claw to hold the flange portion therebetween.

The rotation prevention claw extends from a side of a first surface of the flange portion to a side of a second surface of the flange portion, and is locked to the second surface, where the side of the second surface is opposite to the first surface, and the elastic claw is in contact with the first surface.

Advantageous Effects of Invention

The window regulator according to the present invention is capable of enhancing assembly workability in a carrier plate.

DESCRIPTION OF EMBODIMENTS (1) Window Regulator

Figure 1:
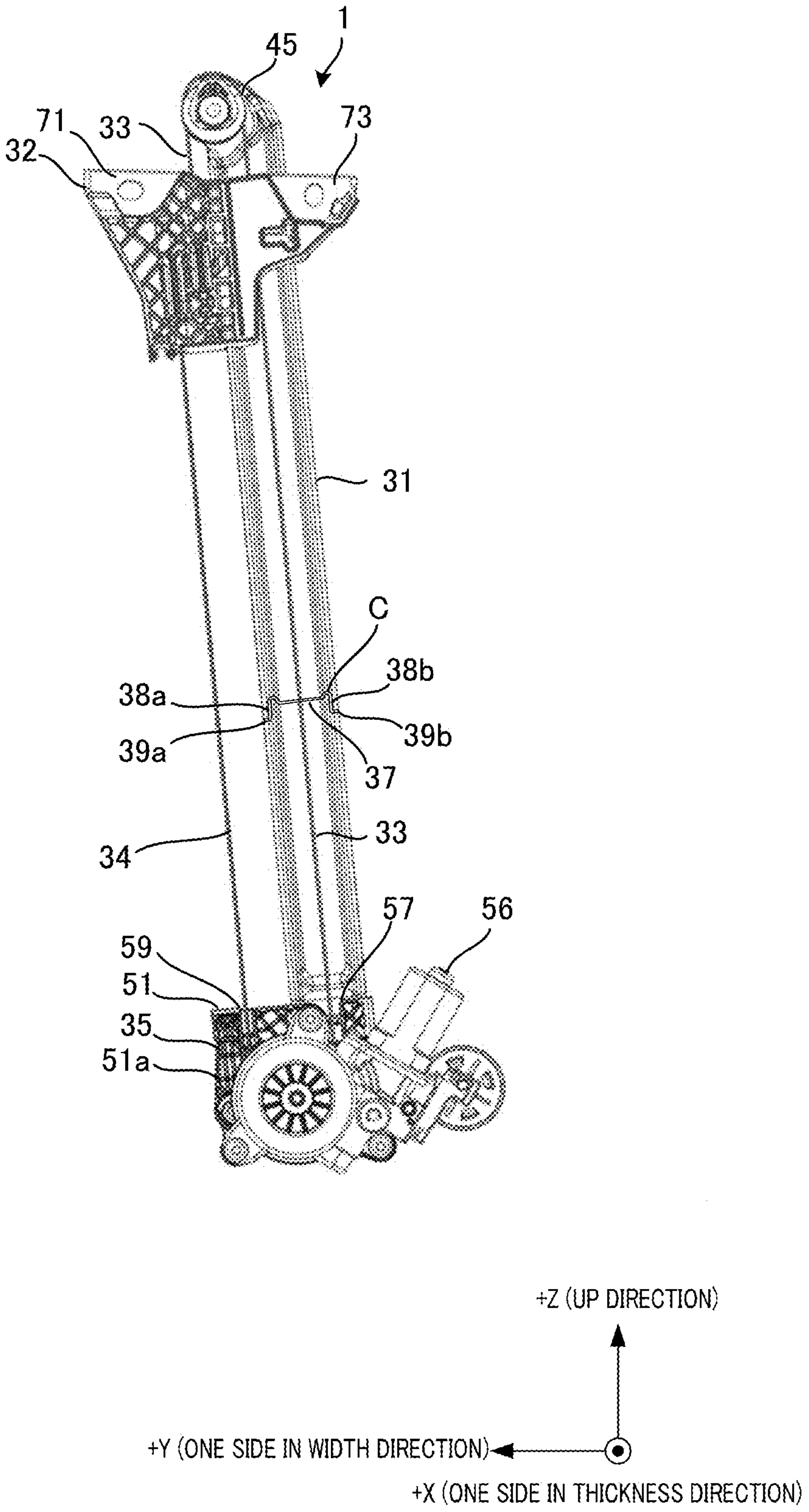
FIG. 1 is a front view of a window regulator according to an embodiment of the present invention.
Figure 2:
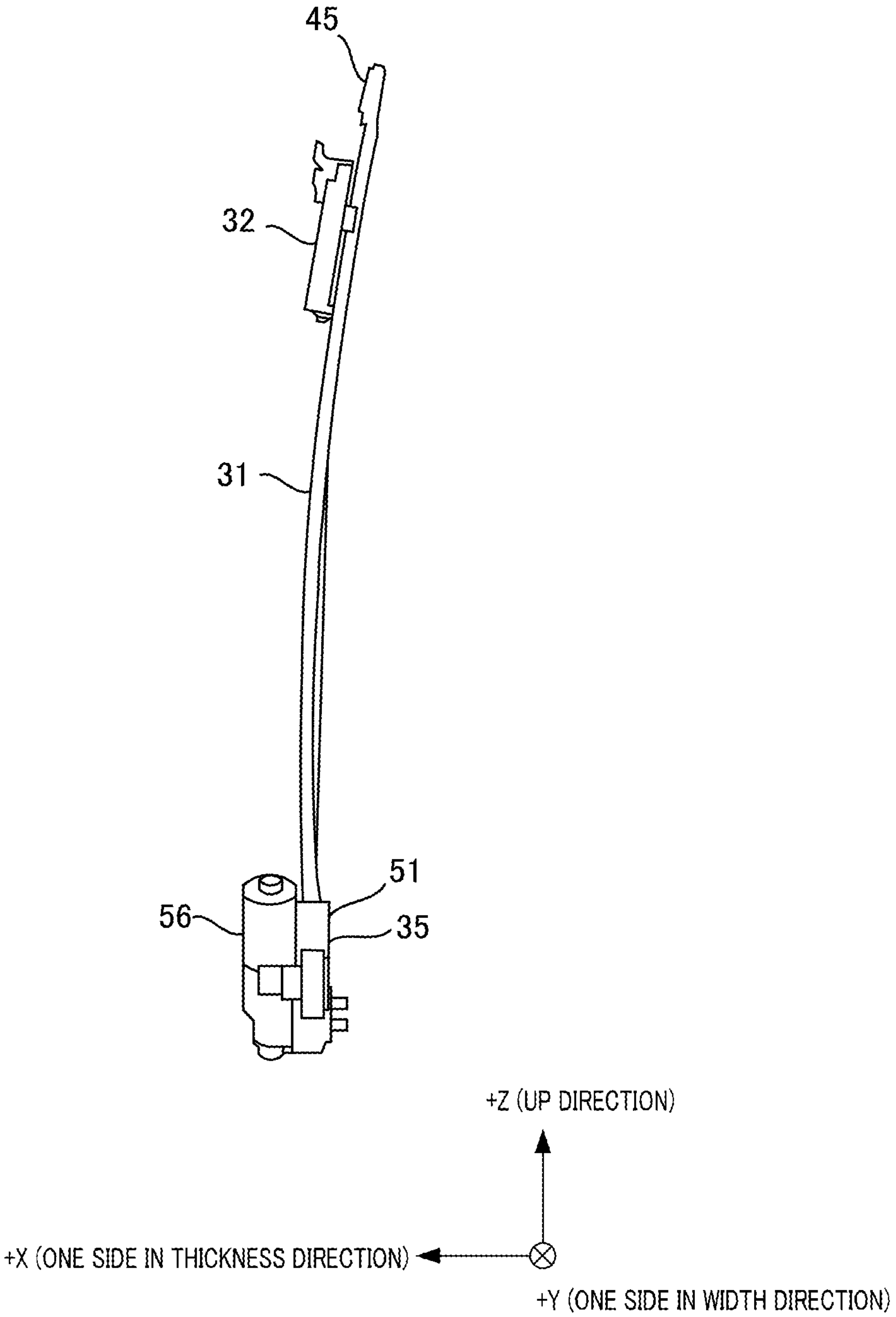
FIG. 2 is a side view of the window regulator.

Window regulator 1 according to an embodiment of the present invention will be described with reference to FIGS. 1 and 2. FIG. 1 is a front view of a window regulator according to an embodiment of the present invention. FIG. 2 is a side view of the window regulator. Note that, in the following description, a front view of window regulator 1 will be described as a view of window regulator 1 when viewed in a plan view. FIG. 1 illustrates an X axis, a Y axis, and a Z axis. The depth direction on the paper surface of FIG. 1 will be referred to as the thickness direction or the X direction, the front side will be referred to as one side in the thickness direction or the "+X direction", and the back side will be referred to as the other side in the thickness direction or the "−X direction". Further, in FIG. 1, the left-right direction will be referred to as the width direction or the Y direction, the left direction will be referred to as one side in the width direction or the "+Y direction", and the right direction will be referred to as the other side in the width direction or the "−Y direction". Further, in FIG. 1, the up-down direction will be referred to as the length direction or the Z direction, the up direction will be referred to as the "+Z direction", and the down direction will be referred to as the "−Z direction". Note that, the raising and lowering direction of the window glass may be referred to as the up-down direction (the Z direction), the raising direction of the window glass may be referred to as the "+Z direction", and the lowering direction of the window glass may be referred to as the "−Z direction".

Window regulator 1 is supported by a door panel (not illustrated) of a vehicle. Window regulator 1 is a mechanism that raises and lowers a window glass (not illustrated), which is a moving object.

As illustrated in FIGS. 1 and 2, window regulator 1 mainly includes guide rail 31, carrier plate 32, raising-side cable 33, lowering-side cable 34, and driving section 35.

Guide rail 31 is a member which is provided along the raising and lowering direction (the Z direction) of the window glass and guides carrier plate 32 in the raising and lowering direction of the window glass. Guide rail 31 extends generally in the up-down direction of the vehicle (the Z direction), and is specifically configured to be inclined slightly obliquely with respect to a window glass to which guide rail 31 is attached.

Figure 3:
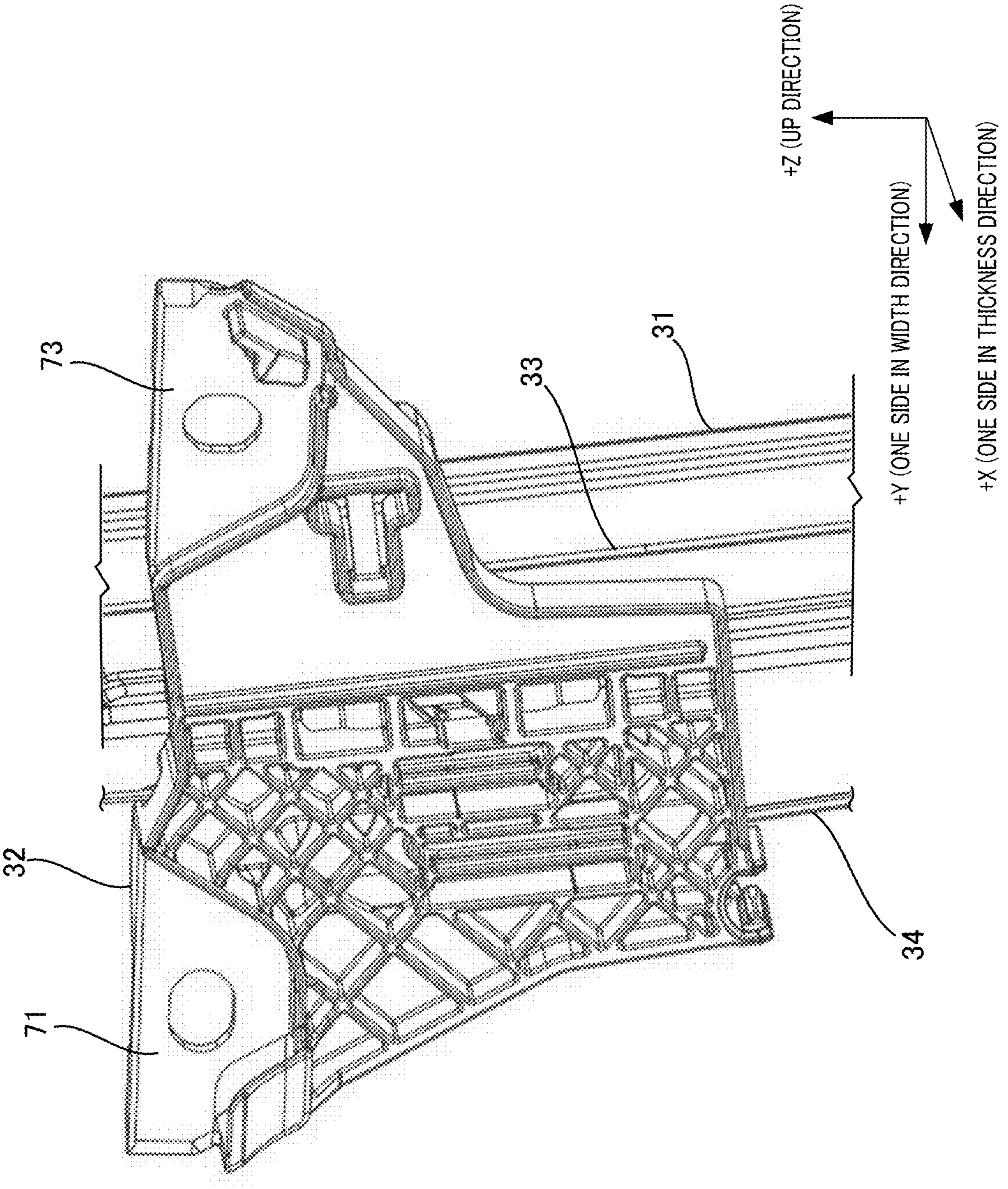
FIG. 3 is a perspective view of a carrier plate assembled to a guide rail.

FIG. 3 is a perspective view of carrier plate 32 assembled to guide rail 31. Carrier plate 32 is a member that holds a lower end portion of the window glass and is engaged with guide rail 31 and slidingly guided in the raising and lowering direction of the window glass. Carrier plate 32 moves up and down along an edge of guide rail 31. The structure of carrier plate 32 will be described in detail later.

Upper cable guide 45 (see FIG. 1) as a direction changing member for changing the movement direction of raising-side cable 33 is provided in an upper end portion of guide rail 31.

As illustrated in FIGS. 1 and 2, driving section 35 for winding and unwinding raising-side cable 33 and lowering-side cable 34 is provided at a lower end of guide rail 31. Driving section 35 includes drum housing 51, a drum (not illustrated), and driving motor 56. Drum housing 51 is attached to a lower end portion of guide rail 31 and fixes guide rail 31 to a door panel (not illustrated) of the vehicle.

Drum housing 51 rotatably supports the drum. Driving motor 56 is integrally attached to drum housing 51 and rotationally drives the drum in both forward and reverse directions.

Raising-side cable 33 and lowering-side cable 34 are configured to pull carrier plate 32 in the up-down direction (the Z direction), and known cables formed by twisting a plurality of metal wires or resin fiber wires can be used. Raising-side cable 33 is coupled to carrier plate 32 at one end of raising-side cable 33, is wound around upper cable guide 45, and is coupled to the drum at the other end of raising-side cable 33. Lowering-side cable 34 is coupled to carrier plate 32 at one end of lowering-side cable 34 and is coupled to the drum at the other end of lowering-side cable 34.

Driving motor 56 rotates the drum, thereby winding and unwinding raising-side cable 33 and lowering-side cable 34.

Figure 4:
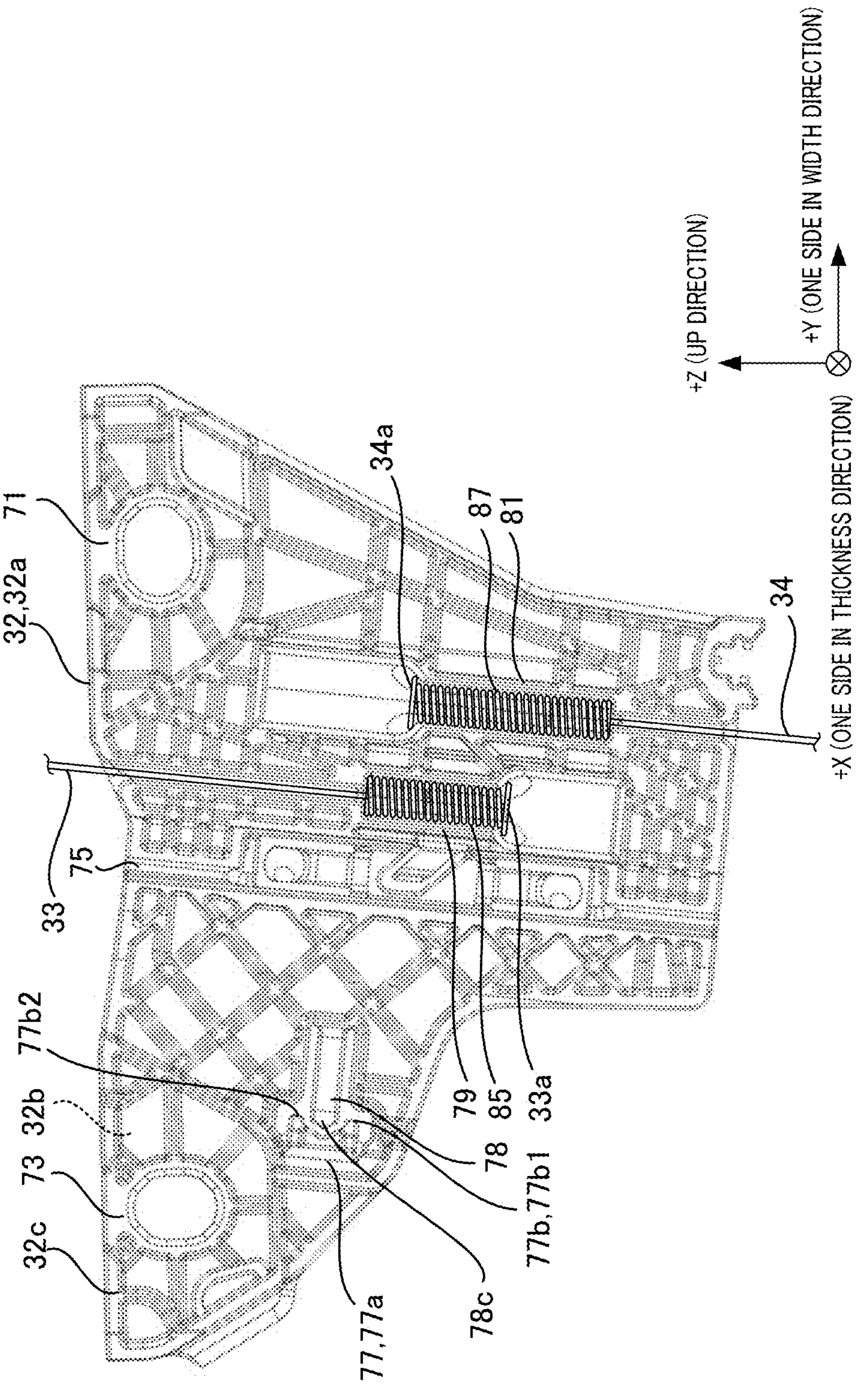
FIG. 4 is an arrow view of the carrier plate as seen from the other side in the thickness direction.

FIG. 4 is an arrow view of the carrier plate as seen from the other side in the thickness direction. End 33*a* (corresponding to "an end portion of a cable" in the present invention) and end 34*a* (corresponding to "an end portion of a cable" in the present invention) are provided at one end of raising-side cable 33 or lowering-side cable 34. Ends 33*a* and 34*a* are formed, for example, by die casting of a metal material, and each include a base end portion to which one end of raising-side cable 33 or lowering-side cable 34 is attached, and a flange portion having an outer diameter larger than that of the base end portion. The base end portion is formed in a columnar shape or a conical trapezoid shape, and one end of raising-side cable 33 or lowering-side cable 34 is fixed to the base end portion by adhesion, welding, bolting, and/or any other method.

Coil spring 85 and coil spring 87 are mounted in end 33*a* and end 34*a*, respectively. Coil spring 85 and coil spring 87 are energizing members that energize ends 33*a* and 34*a* in directions to eliminate looseness of raising-side cable 33 and lowering-side cable 34, respectively.

(2) Guide Rail

Guide rail 31 is gently curved to match the curvature of the window glass of an automobile. Guide rail 31 is made of, for example, stainless steel, aluminum alloy, and/or another hard material.

FIG. 1 illustrates a front view of guide rail 31, on which cross section C, which is U-shaped, of guide rail 31 when viewed from the up direction is superimposed. Guide rail 31 includes base portion 37, both sidewall portions 38*a* and 38*b*, flange portion 39*a*, and flange portion 39*b*. Base portion 37 has a predetermined length in the width direction (the Y direction) and extends in the up-down direction (the Z direction). Sidewall portion 38*a* is located at an end of base portion 37 on a side of one end in the width direction (in the +Y direction), and is erected from a long side of base portion 37 along the length direction (the Z direction) of base portion 37. Sidewall portion 38*b* is located at an end of base portion 37 on a side of the other end in the width direction (in the −Y direction), and is erected from the long side of base portion 37 along the length direction (the Z direction) of base portion 37.

Flange portion 39*a* extends, while forming a right angle with sidewall portion 38*a*, parallel to base portion 37 and to the side of the one end in the width direction (in the +Y direction).

Flange portion 39*b* extends, while forming a right angle with sidewall portion 38*b*, parallel to base portion 37 and to the side of the other end in the width direction (in the −Y direction).

(3) Drum Housing

Drum housing 51 includes main body 51*a* which includes a fitting portion with respect to guide rail 31 and a drum-accommodation portion having a cylindrical shape. In main body 51*a*, a recess having a columnar shape is formed which accommodates the drum therein. Raising-side cable lead-out groove 57 and lowering-side cable lead-out groove 59 are formed in main body 51*a*. Raising-side cable lead-out groove 57 and lowering-side cable lead-out groove 59 are provided respectively for allowing raising-side cable 33 and lowering-side cable 34 to pass through from the recess to lead out raising-side cable 33 and lowering-side cable 34 outside.

(4) Structure of Carrier Plate

Figure 5:
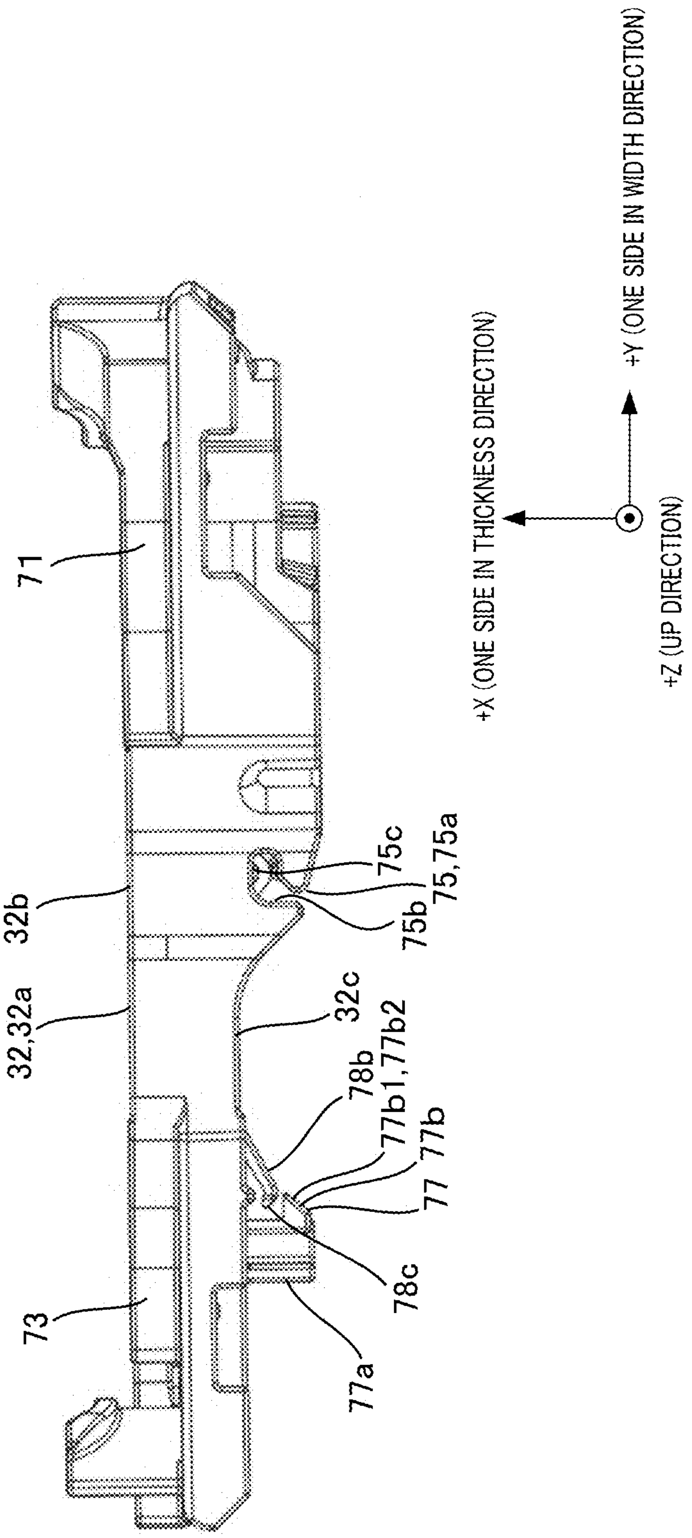
FIG. 5 is an arrow view of the carrier plate as seen from the up direction.
Figure 6A:
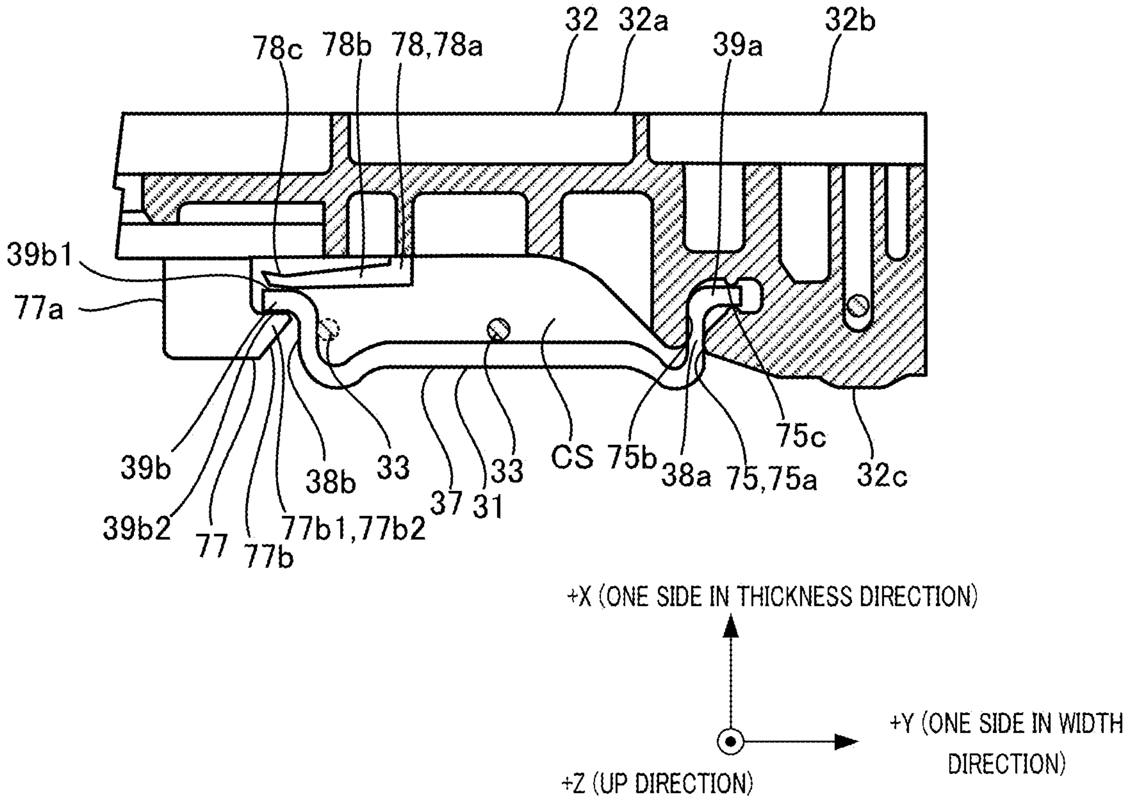
FIG. 6A is a partial cross-sectional view illustrating the structure of the carrier plate in an example of the present embodiment.

Next, the structure of carrier plate 32 in the present embodiment will be described with reference to FIGS. 4, 5, and 6A. FIG. 5 is an arrow view of carrier plate 32 as seen from the up direction. FIG. 6A is a partial cross-sectional view illustrating the structure of carrier plate 32 in the present embodiment.

Carrier plate 32 includes main body 32*a*. Main body 32*a* is a base body, and may be any portion in which another structure is formed.

Attachment portions 71 and 73 are provided at surface 32*b* (corresponding to the "second surface" of the present invention) provided in main body 32*a* and located on the one side in the thickness direction (in the +X direction). A holder (not illustrated) for holding a window glass (not illustrated) is attached to attachment portions 71 and 73. Further, each of guide groove 75 (corresponding to the "fitting portion" of the present invention), rotation prevention claw 77, elastic claw 78, raising-side end holder 79 (corresponding to the "accommodation portion" of the present invention), and lowering-side end holder 81 (corresponding to the "accommodation portion" of the present invention) is provided at surface 32*c* provided in main body 32*a* and located on the other side in the thickness direction (in the −X direction).

Guide groove 75 is disposed in a center portion in the width direction (the Y direction). Guide groove 75 includes: opening portion 75*a* that opens to the other side in the thickness direction (in the −X direction) of main body 32*a*; groove 75*b* that extends from opening portion 75*a* to the one side in the thickness direction (in the +X direction); and groove 75*c* that extends from the bottom of groove 75*b* to the one side in the width direction (in the +Y direction). Groove 75*b* is a groove for sliding sidewall portion 38*a* (see FIG. 6A) of guide rail 31. Further, groove 75*c* is a groove for sliding flange portion 39*a* (see FIG. 6A) of guide rail 31.

In the state illustrated in FIG. 6A in which carrier plate 32 is assembled to guide rail 31, in other words, in a state in which guide groove 75 is slidable with respect to sidewall portion 38*a* and flange portion 39*a*, a gap provided between groove 75*b* and sidewall portion 38*a* is small. Further, a gap provided between groove 75*c* and flange portion 39*a* is small. Sidewall portion 38*a* and flange portion 39*a* have an L-shaped cross-sectional shape in the XY plane. Thus, rattling of a center portion of carrier plate 32 located in the center thereof in the width direction is less likely to occur in the thickness direction (the X direction) and the width direction (the Y direction) with respect to sidewall portion 38*a* and flange portion 39*a*.

Rotation prevention claw 77 is disposed on the other side in the width direction (in the −Y direction) with respect to guide groove 75. Rotation prevention claw 77 prevents rotation of carrier plate 32 around guide groove 75. Rotation prevention claw 77 includes wall 77*a* that extends from surface 32*c*, which is provided in main body 32*a* and located on the other side in the thickness direction (in the −X direction), in the −X direction; and protrusion 77*b* that protrudes from a leading end of wall 77*a* to the one side in the width direction (in the +Y direction). Protrusion 77*b* includes first claw portion 77*b*1 and second claw portion 77*b*2. First claw portion 77*b*1 and second claw portion 77*b*2 are disposed away from each other in the up-down direction (the Z direction).

Elastic claw 78 is disposed between guide groove 75 and rotation prevention claw 77 in the width direction (the Y direction). Elastic claw 78 includes: base end portion 78*a* disposed at surface 32*c* provided in main body 32*a* on the other side in the thickness direction (in the −X direction); extension portion 78*b* extending in an oblique direction from base end portion 78*a* to the other side in the width direction (in the −Y direction) with respect to the other side in the thickness direction (the −X direction), and leading-end portion 78*c* protruding from extension portion 78*b* to the other side in the width direction (in the −Y direction) so as to be close to protrusion 77*b*. Leading-end portion 78*c* is disposed between first claw portion 77*b*1 and second claw portion 77*b*2 in a plan view from the thickness direction. Further, leading-end portion 78*c* is located on the one side in the thickness direction (in the +X direction) with respect to first claw portion 77*b*1 and second claw portion 77*b*2.

Elastic claw 78 has elasticity. Thus, elastic claw 78 has, for example, a restoring force to return to the other side in the thickness direction (in the −X direction) in a case where elastic claw 78 is bent to the one side in the thickness direction (in the +X direction) by an external force or the like.

Figure 6B:
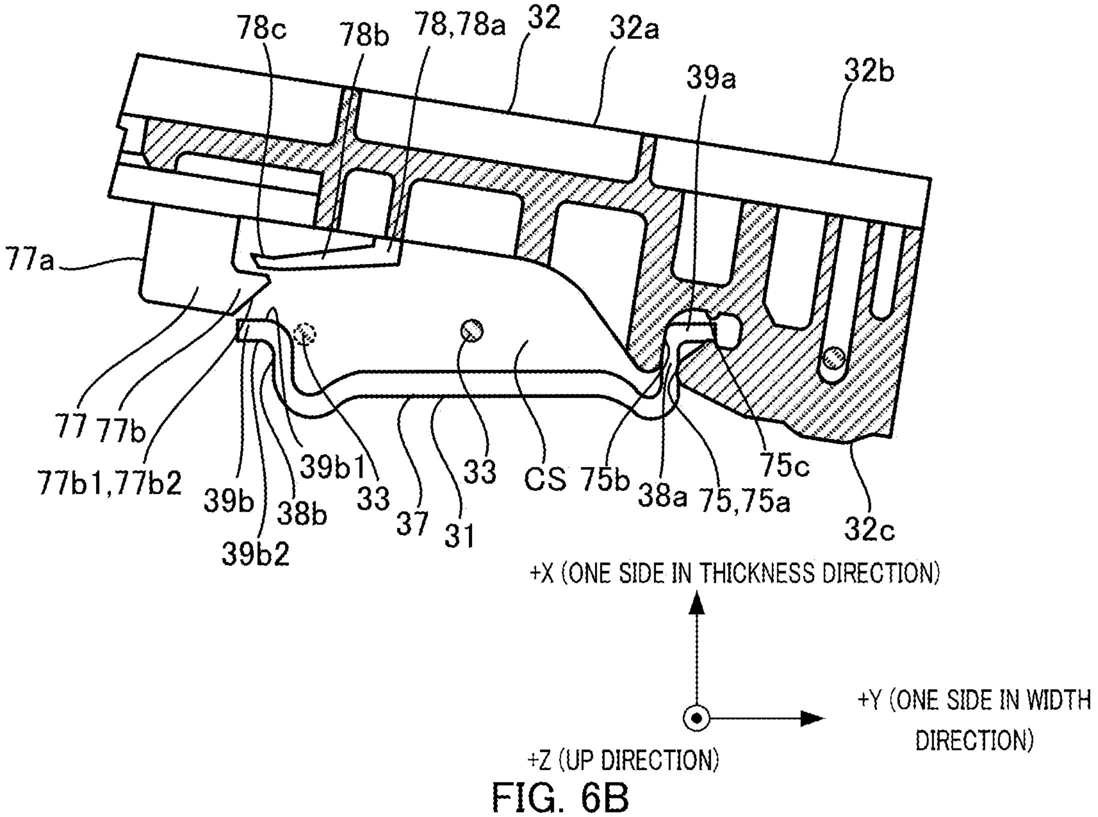
FIG. 6B is a partial cross-sectional view illustrating the carrier plate during assembly work in an example of the present embodiment.

Next, the mutual positional relationship between rotation prevention claw 77 and elastic claw 78 will be described with reference to FIGS. 4, 5, 6A, and 6B. FIG. 6B is a partial cross-sectional view illustrating a carrier plate during assembly work in an example of the present embodiment. Rotation prevention claw 77 includes first claw portion 77*b*1 and second claw portion 77*b*2. Elastic claw 78 includes leading-end portion 78*c* that is disposed between first claw portion 77*b*1 and second claw portion 77*b*2 in a plan view from the thickness direction (see FIGS. 4 and 6B).

Note that, in the assembly work of carrier plate 32 in the present embodiment and the assembly work of carrier plate 320 in a comparative example as described below, a description will be given by applying the positional relationship with an obstacle to raising-side cable 33, but the present invention is not limited thereto, and a description may be given by applying the positional relationship with an obstacle to lowering-side cable 34.

In the assembly process of window regulator 1, end 33*a* of raising-side cable 33 is assembled to carrier plate 32 before carrier plate 32 is assembled to guide rail 31. Further, raising-side cable 33 is routed between guide rail 31 and carrier plate 32. Thus, in carrier plate 320 in the related art, raising-side cable 33 may intrude between elastic claw 78 and rotation prevention claw 77 during assembly work illustrated in FIG. 6B, in which carrier plate 32 is assembled to guide rail 31. However, in carrier plate 32 in the present embodiment, since leading-end portion 78*c* is disposed between first claw portion 77*b*1 and second claw portion 77*b*2 in a plan view from the thickness direction, it is possible to prevent raising-side cable 33 from intruding between first claw portion 77*b*1 and second claw portion 77*b*2.

In the state illustrated in FIG. 6A in which carrier plate 32 is assembled to guide rail 31, in other words, in a state in which the groove (gap) provided between leading-end portion 78*c* and protrusion 77*b* is slidable with respect to flange portion 39*b*, leading-end portion 78*c* and protrusion 77*b* hold flange portion 39*b* therebetween in the thickness direction (the X direction). In this case, leading-end portion 78*c* presses flange portion 39*b* to a side of protrusion 77*b* (in the −X direction). That is, leading-end portion 78*c* is in contact with surface 39*b*1 (corresponding to the "first surface" of the present invention) provided in flange portion 39*b* and located on the one side in the thickness direction (in the +X direction). Further, protrusion 77*b* is in contact with surface 39*b*2 (corresponding to the "second surface" of the present invention) provided in flange portion 39*b* and located on the other side in the thickness direction (in the −X direction). Thus, rattling of the end portion of carrier plate 32 on the other side in the width direction (in the −Y direction) is less likely to occur in the thickness direction (the X direction) with respect to flange portion 39*b*.

Thus, in the state illustrated in FIG. 6A in which carrier plate 32 is assembled to guide rail 31, guide groove 75 slides flange portion 39*a* provided in guide rail 31. The groove (gap) provided between protrusion 77*b* and leading-end portion 78*c* slides flange portion 39*b* provided in guide rail 31. Rotation of carrier plate 32 around flange portion 39*a* can be stopped by flange portion 39*b* being locked in the thickness direction (the X direction) by protrusion 77*b*.

Further, in the state illustrated in FIG. 6A in which carrier plate 32 is assembled to guide rail 31, closed space CS is formed by carrier plate 32 and guide rail 31. Raising-side cable 33 is in a position in a center portion in the width direction (the Y direction) in closed space CS, and is passed through in closed space CS in the up-down direction (the Z direction). In closed space CS, there is no obstacle that would prevent the movement of raising-side cable 33 in the width direction (the Y direction). Thus, raising-side cable 33 can move from one position of a position toward a side of sidewall portion 38*a* and a position toward a side of sidewall portion 38*b* to the other position in closed space CS. Since there is no obstacle, which would prevent the movement of raising-side cable 33 in the width direction (the Y direction), in closed space CS, even in a case where raising-side cable 33 is located toward a side of sidewall portion 38*b* during the assembly work of carrier plate 32, it is possible to move raising-side cable 33 from the position toward the side of sidewall portion 38*b* to a position in the center portion in the width direction (the Y direction) in closed space CS by the time the assembly work of carrier plate 32 is completed. In the following description, the position of raising-side cable 33 when the assembly work of carrier plate 32 is completed will be referred to as the "correct position". FIG. 6A illustrates raising-side cable 33 in the correct position with a solid line. Further, the position of raising-side cable 33 other than the correct position will be referred to as an "error position". FIG. 6A illustrates raising-side cable 33 in an error position with a broken line.

Comparative Example

Figure 7A:
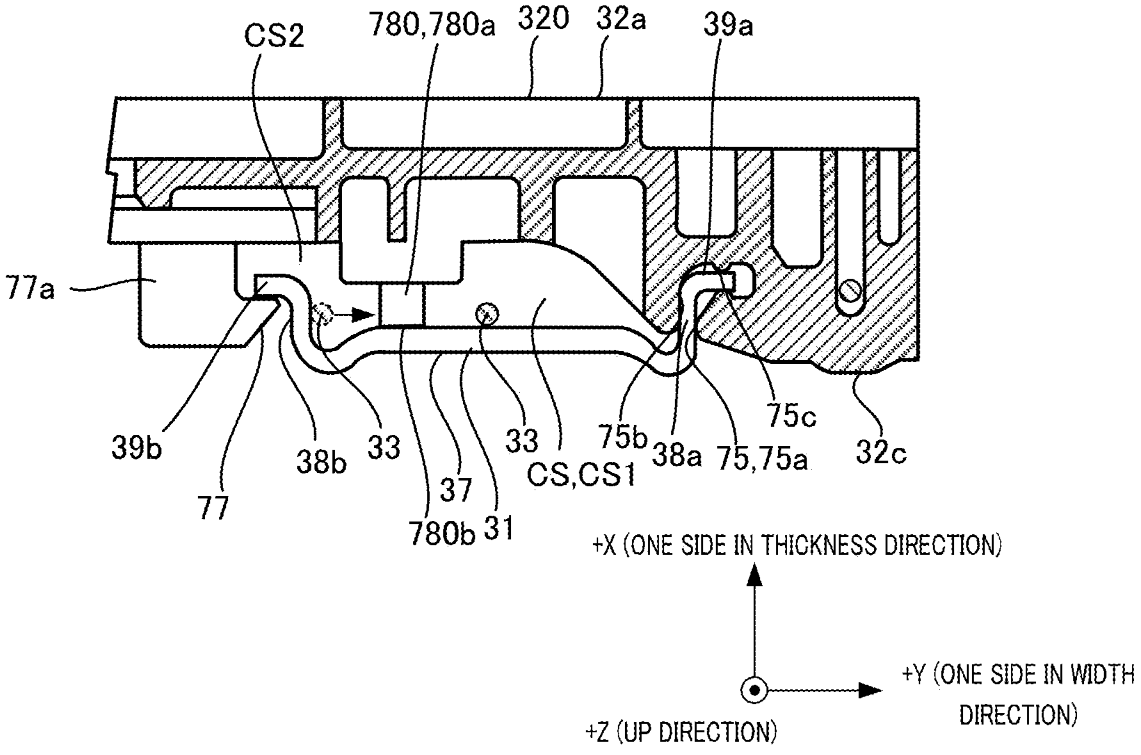
FIG. 7A is a partial cross-sectional view illustrating the structure of the carrier plate in a comparative example.
Figure 7B:
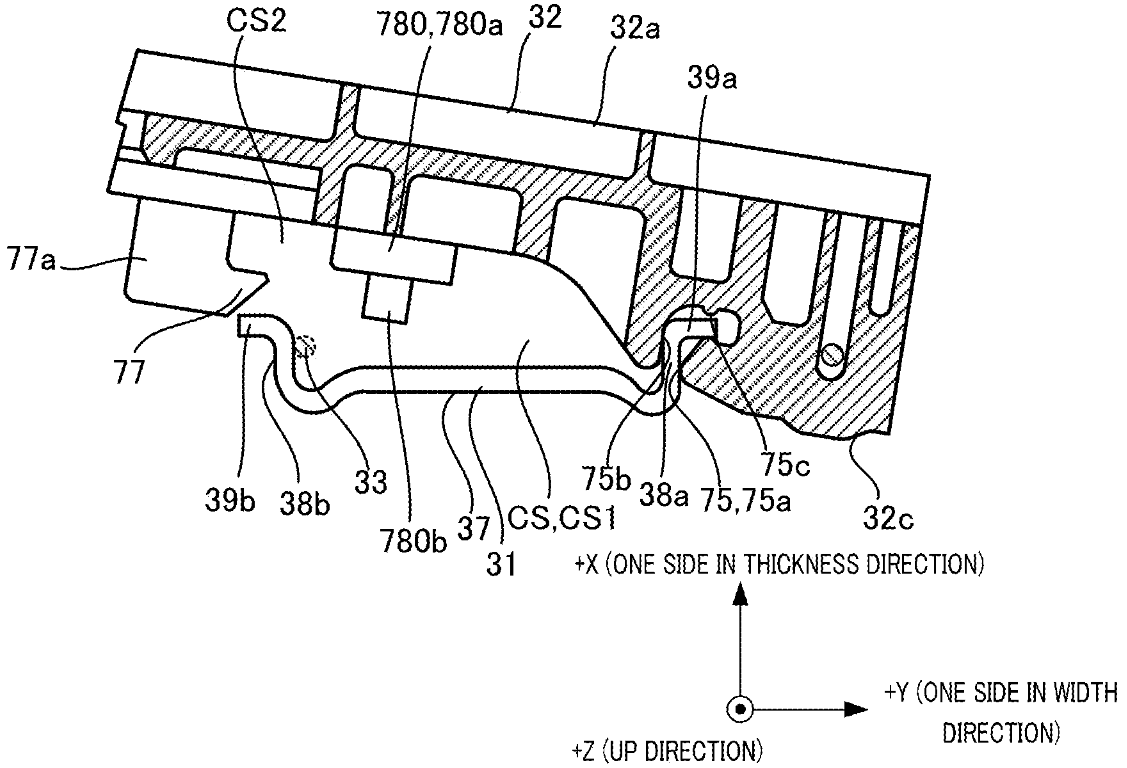
FIG. 7B is a partial cross-sectional view illustrating the carrier plate during assembly work in the comparative example.
Figure 7C:
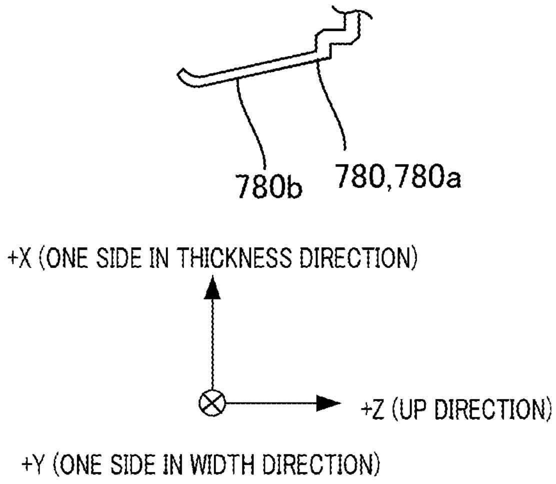
FIG. 7C is an arrow view of an elastic claw in the comparative example as seen from the other side in the width direction.

Next, the structure of carrier plate 320 in a comparative example will be described with reference to FIG. 7A. FIG. 7A is a partial cross-sectional view illustrating the structure of carrier plate 320 in a comparative example. FIG. 7B is a partial cross-sectional view illustrating carrier plate 320 during assembly work in the comparative example. FIG. 7C is an arrow view of the elastic claw in the comparative example as seen from the other side in the width direction. Note that, in the description of the comparative example, configurations different from those in the structure of carrier plate 32 in the present embodiment will be described, and the same configurations will be denoted with the same reference signs and descriptions thereof will be omitted.

Carrier plate 320 includes main body 32*a*, attachment portions 71 and 73, guide groove 75, rotation prevention claw 77, elastic claw 780, raising-side end holder 79, and lowering-side end holder 81.

Elastic claw 780 in the comparative example is disposed between guide groove 75 and rotation prevention claw 77 in the width direction (the Y direction). Elastic claw 780 includes base end portion 780*a*, and base end portion 780*a* is disposed at surface 32*c* provided in main body 32*a* and located on the other side in the thickness direction (the −X direction). Further, elastic claw 780 includes extension portion 780*b* (see FIG. 7C), and extension portion 780*b* extends in an oblique direction from base end portion 780*a* to the other side in the thickness direction (in the −X direction) with respect to the down direction (the −Z direction). A leading end of elastic claw 780, at which extension portion 780*b* extends, is bent in an arc shape to the one side in the thickness direction (in the +X direction). Extension portion 780*b* according to the comparative example is different from extension portion 78*b* in the present embodiment, which extends in an oblique direction from base end portion 780*a* to the other side in the width direction (in the −Y direction) with respect to the other side in the thickness direction (the −X direction). In the state illustrated in FIG. 7A in which carrier plate 320 is assembled to guide rail 31, extension portion 780*b* is in contact with a surface provided in base portion 37 and located on the one side in the thickness direction (in the +X direction). That is, elastic claw 780 is disposed to couple surface 32*c*, which is provided in main body 32*a* and located on the other side in the thickness direction, to the surface, which is provided in base portion 37 and located on the one side in the thickness direction (in the +X direction).

In the state illustrated in FIG. 7A in which carrier plate 320 is assembled to guide rail 31, closed space CS is formed by carrier plate 32 and guide rail 31. Closed space CS is divided by elastic claw 780 into space CS1 located on a side of sidewall portion 38*a* and space CS2 located on a side of sidewall portion 38*b*.

While closed space CS is divided into space CS1 and space CS2 by elastic claw 780, raising-side cable 33 is in space CS1 located on the side of sidewall portion 38*a*, and is passed through in space CS1 in the up-down direction (the Z direction).

Since extension portion 780*b*, which is an obstacle that prevents the movement of raising-side cable 33 in the width direction (the Y direction), is present in closed space CS, raising-side cable 33 is prevented from moving from one position of a position toward sidewall portion 38*a* (space CS1) and a position toward the side of sidewall portion 38*b* (space CS2) to the other position. Note that, in the following description, the position (correct position) in which carrier plate 320 should be when the assembly work is completed will be described as a position toward to sidewall portion 38*a* (space CS1). FIG. 7A illustrates raising-side cable 33 in the correct position with a solid line, and raising-side cable 33 in a position (error position) toward sidewall portion 38*b* with a broken line.

(Assembly Work of Carrier Plate in Comparative Example)

Next, the assembly work of carrier plate 320 in the comparative example will be described with reference to FIGS. 7A and 7B.

In the assembly work of carrier plate 320, as illustrated in FIG. 7B, sidewall portion 38*a* and flange portion 39*a* which are end portions provided in guide rail 31 and located on the one side in the width direction (in the +Y direction) are fitted into guide groove 75, and carrier plate 320 is rotated counterclockwise around the end portion on the one side in the width direction in FIG. 7B. At this time, raising-side cable 33 may be in a position toward a side of sidewall portion 38*b*, which is an error position, due to slack or the like. FIG. 7B illustrates the raising-side cable 33 in an error position with a broken line.

Next, carrier plate 320 is rotated counterclockwise around the end portion on the one side in the width direction, and flange portion 39*b* is locked to rotation prevention claw 77 as illustrated in FIG. 7A. In this manner, carrier plate 320 is assembled to guide rail 31. At this time, raising-side cable 33 may still be in a position toward a side of sidewall portion 38*b*, which is an error position. In other words, raising-side cable 33 may be in space CS2.

After carrier plate 320 is assembled to guide rail 31, a tension is applied to raising-side cable 33. Thus, raising-side cable 33 attempts, without slack or the like, to move from a position toward a side of sidewall portion 38*b*, which is an error position, to a position toward a side of sidewall portion 38*a* (space CS1), which is the correct position, in other words, will move onto a straight line connecting raising-side cable lead-out groove 57 of drum housing 51*a* to a lead-out portion for raising-side cable 33 in upper pulley 45. In this case, since closed space CS is divided into space CS1 and space CS2 by elastic claw 780, elastic claw 780 prevents the movement of raising-side cable 33. Thus, since raising-side cable 33 is not routed in the correct position, it may require redoing the assembly work of carrier plate 320, which may lead to a decrease in assembly workability in carrier plate 320.

(Assembly Work of Carrier Plate in the Present Embodiment)

Next, the assembly work of carrier plate 32 in the present embodiment will be described with reference to FIGS. 6A and 6B. FIG. 6B is a partial cross-sectional view illustrating the carrier plate during attachment work in the present embodiment. Note that, in the following description, the position (correct position) of carrier plate 32 when the attachment work is completed will be described as a position in a center portion in the width direction (the Y direction) in closed space CS. FIG. 6B illustrates raising-side cable 33 in the correct position with a solid line. Further, FIG. 6B illustrates raising-side cable 33 in a position toward a side of sidewall portion 38*b*, which is an error position, with a broken line.

In the assembly work of carrier plate 32, as illustrated in FIG. 6B, sidewall portion 38*a* and flange portion 39*a* which are end portions provided in guide rail 31 and located on the one side in the width direction (in the +Y direction) are fitted into guide groove 75, and carrier plate 32 is rotated counterclockwise around the end portion on the one side in the width direction in FIG. 6B. At this time, raising-side cable 33 may be in a position toward a side of sidewall portion 38*b*, which is an error position, due to slack or the like.

Next, carrier plate 32 is rotated counterclockwise around the end portion on the one side in the width direction, and flange portion 39*b* is locked to rotation prevention claw 77 as illustrated in FIG. 6A. In this manner, carrier plate 32 is assembled to guide rail 31. At this time, raising-side cable 33 may still be in a position toward a side of sidewall portion 38*b*, which is an error position.

After carrier plate 32 is assembled to guide rail 31, a tension is applied to raising-side cable 33. Thus, raising-side cable 33 attempts, without slack and the like, to move from the error position to a position toward a side of sidewall portion 38*a*, which is the correct position. In this case, since there is no obstacle, which would prevent the movement of raising-side cable 33, in closed space CS, raising-side cable 33 is routed in the correct position instead of the error position. Thus, it is possible to enhance assembly workability in carrier plate 32 because there is no need to redo the assembly work of carrier plate 32.

Carrier plate 32 in the above embodiment is a carrier plate that is slidably guided on guide rail 31 by transmission of a driving force of driving section 35 by raising-side cable 33 and lowering-side cable 34, and includes: base portion 37; guide groove 75 that fits with guide rail 31; rotation prevention claw 77 that is provided away from guide groove 75, on one side in the width direction of base portion 37, and prevents rotation of carrier plate 32 around guide groove 75 with respect to guide rail 31; raising-side end holder 79 and lowering-side end holder 81 that are provided on the other side in the width direction of base portion 37 with respect to guide groove 75, and accommodate end portions of raising-side cable 33 and lowering-side cable 34, respectively; and elastic claw 78 that is in contact with a surface provided in flange portion 39*b* and located on the one side in the thickness direction (in the +X direction).

Since the above configuration causes elastic claw 78 to be in contact with surface 39*b*1 of flange portion 39*b* during the attachment work in which carrier plate 32 is assembled to guide rail 31, movement of raising-side cable 33 is not obstructed by elastic claw 78 compared to a structure in which elastic claw 78 is in contact with a surface on the one side in the thickness direction of base portion 37 of guide rail 31 on the movement path of raising-side cable 33 in closed space CS. That is, intrusion between rotation prevention claw 77 and elastic claw 78 is prevented. Thus, it is possible to enhance assembly workability in window regulator 1 even in a structure in which elastic claw 78 is brought into contact with guide rail 31, since there is no need to redo the assembly work of carrier plate 32.

Further, in carrier plate 32 in the above embodiment, rotation prevention claw 77 includes first claw portion 77*b*1 and second claw portion 77*b*2, and first claw portion 77*b*1 and second claw portion 77*b*2 are disposed away from each other in the up-down direction (the Z direction) of base portion 37. Leading-end portion 78*c* of elastic claw 78 is disposed in a region between first claw portion 77*b*1 and second claw portion 77*b*2, that is, in a region between first claw portion 77*b*1 and second claw portion 77*b*2 in a plan view. Even when raising-side cable 33 attempts to intrude between rotation prevention claw 77 and elastic claw 78, it is possible to prevent the intrusion of raising-side cable 33 therebetween because leading-end portion 78*c* is inserted between first claw portion 77*b*1 and second claw portion 77*b*2. Further, since the structure is such that elastic claw 78 is held between first claw portion b1 and second claw portion b2 in a plan view, the prevention of rattling by elastic claw 78 pressing surface **39*b*1 of flange portion 39*b*** becomes more effective.

Further, in carrier plate 32 in the above embodiment, elastic claw 78 extends in the width direction (the Y direction) of base portion 37. In a case where raising-side cable 33 attempts to move in the width direction during the assembly work of carrier plate 32, it is easier for raising-side cable 33 to move along elastic claw 78. Further, the carrier plate can be downsized as compared to a case where elastic claw 78 and rotation prevention claw 77 are disposed along the up-down direction (the Z direction) of base portion 37, in flange portion **39*b*. Further, elastic claw 78 includes extension portion 78*b* that extends in an oblique direction from base end portion 78*a*, which is disposed on surface 32*c* provided in main body 32*a* on the other side in the thickness direction (in the −X direction), to the other side in the width direction (in the −Y direction) with respect to the other side in the thickness direction (the −X direction). Accordingly, even when raising-side cable 33 comes into contact with a surface of elastic claw 78 on a side of base portion 37 during the attachment work of the carrier plate, it is possible to guide raising-side cable 33 to the side of base portion 37, and it is possible to prevent raising-side cable 33 from further entering the inside of elastic claw 78 (a space at elastic claw 78 on a side of main body 32*a***).

Variation 1

Next, a variation of the structure that prevents raising-side cable 33 from intruding between rotation prevention claw 77 and elastic claw 78 will be described.

In the above embodiment, a region may be included in which rotation prevention claw 77 and elastic claw 78 overlap with each other when viewed in a direction orthogonal to the thickness direction (the X direction) of carrier plate 32 and the width direction (the Y direction) of carrier plate 32, that is, in the up-down direction (the Z direction). Even when raising-side cable 33 attempts to intrude between rotation prevention claw 77 and elastic claw 78, it is possible to prevent the intrusion of raising-side cable 33 therebetween because rotation prevention claw 77 and elastic claw 78 overlap in the up-down direction (the X direction).

Variation 2

In the above embodiment, a gap between elastic claw 78 and rotation prevention claw 77 may be formed to be smaller than the outer diameter of raising-side cable 33. In other words, the gap formed by leadin-end portion **78*c* of elastic claw 78 and protrusion 77*b* of rotation prevention claw 77 is smaller than the outer diameter of raising-side cable 33. Thus, even when raising-side cable 33 is away from the surface on the one side in the thickness direction of base portion 37 of guide rail 31 and is located on a side of surface 32*c* of carrier plate 32, that is, in a position close to elastic claw 78, and even when raising-side cable 33 attempts to intrude between rotation prevention claw 77 and elastic claw 78, it is possible to prevent the intrusion of raising-side cable 33 therebetween because raising-side cable 33** cannot pass through the gap.

Variation 3

In the above embodiment, elastic claw 78 extends in the width direction (the Y direction) of base portion 37, but the present invention is not limited thereto, and elastic claw 78 may extend in a direction orthogonal to each of the width direction (the Y direction) of base portion 37 and the thickness direction (the X direction) of carrier plate 32, that is, the up-down direction (the Z direction). Even in this case, rotation prevention claw 77 and elastic claw 78 constitute a structure that prevents raising-side cable 33 from intruding between rotation prevention claw 77 and elastic claw 78. Further, in this case, elastic claw 78 and rotation prevention claw 77 are disposed along flange portion **39*b*, and thus, the structure is such that raising-side cable 33 is less likely to enter the gap between elastic claw 78 and rotation prevention claw 77. Further, since elastic claw 78 is disposed along flange portion 39*b*, it is less likely to cause sliding resistance when carrier plate 32 slides on guide rail 31**.

Variation 4

In the above embodiment, a gap may be provided between rotation prevention claw 77 and elastic claw 78 such that raising-side cable 33 does not intrude into the gap from the thickness direction (the X direction) of carrier plate 32. Thus, even when raising-side cable 33 attempts to intrude between rotation prevention claw 77 and elastic claw 78 from the thickness direction (the X direction), it is possible to prevent raising-side cable 33 from intruding between rotation prevention claw 77 and elastic claw 78. Specifically, the gap provided between rotation prevention claw 77 and elastic claw 78 may be a gap having a curved shape when viewed in the thickness direction (the X direction) of carrier plate 32. Thus, in a case where raising-side cable 33, which is routed in a straight-line shape, attempts to intrude into the gap from the thickness direction (the X direction), it is possible to prevent raising-side cable 33 from intruding thereto because the gap has a curved shape.

Variation 5

In the above embodiment, protrusion **77*b* of rotation prevention claw 77 may include a leading-end edge extending in the up-down direction (the Z direction), and the leading-end edge may include a recessed portion in which a center portion located in the center thereof in the up-down direction is recessed inward to the other side in the width direction (in the −Y direction) in a plan view from the thickness direction (the X direction). Further, leading-end portion 78*c* of elastic claw 78 may be disposed so as to enter the recessed portion in a plan view from the thickness direction. When leading-end portion 78*c* enters the recessed portion, a gap provided between rotation prevention claw 77 and elastic claw 78 does not have a straight-line shape, and thus, it is possible to prevent raising-side cable 33**, which is routed in a straight-line shape, from intruding the gap.

While a preferred embodiment of the present invention has been described above, the present invention is not limited to the embodiment described above, but various changes are possible without departing from the spirit of the present invention. In particular, a plurality of embodiments and variations described herein may be arbitrarily combined as needed.

INDUSTRIAL APPLICABILITY

The present invention is applicable to a window regulator for driving a window glass of an automobile up and down.

REFERENCE SIGNS LIST

1 Window regulator
31 Guide rail

32 Carrier plate
320 Carrier plate
**32*a*** Main body
33 Raising-side cable
**33*a*** End
34 Lowering-side cable
**34*a*** End
35 Driving section
37 Base portion
**38*a*** Sidewall portion
**38*b*** Sidewall portion
**39*a*** Flange portion
**39*b*** Flange portion
**39*b*1** Surface
**39*b*2** Surface
45 Upper cable guide
51 Drum housing
**51*a*** Main body
56 Driving motor
57 Raising-side cable lead-out groove
59 Lowering-side cable lead-out groove
71 Attachment portion
73 Attachment portion
75 Guide groove
**75*a*** Opening portion
**75*b*** Groove
**75*c*** Groove
77 Rotation prevention claw
**77*a*** Wall
**77*b*** Protrusion
**77*b*1** First claw portion
**77*b*2** Second claw portion
78 Elastic claw
780 Elastic claw
**78*a*** Base end portion
**780*a*** Base end portion
**78*b*** Extension portion
**780*b*** Extension portion
**78*c*** Leading-end portion
79 Raising-side end holder
81 Lowering-side end holder
85 Coil spring
87 Coil spring

The invention claimed is:

1. A carrier plate that is slidably guided on or along a guide rail by transmission of a driving force of a driving section by a cable, the guide rail including: a base portion; an erected portion that is erected from the base portion and is connected to the base portion at one end of the erected portion; and a flange portion that is connected to another end of the erected portion, the carrier plate comprising:

a base body;

a fitting portion that fits with the guide rail;

a rotation prevention claw that is provided on one side of the fitting portion in a width direction of the carrier plate, and prevents rotation of the carrier plate around the fitting portion with respect to the guide rail;

an accommodation portion that is provided on another side of the fitting portion in the width direction of the carrier plate, and accommodates an end portion of the cable; and an elastic claw that includes a leading-end portion located, in a case where the base body is viewed along a sliding direction of the carrier plate, in a position overlapping with the rotation prevention claw in a direction orthogonal to the sliding direction and the width direction of the carrier plate, the leading-end portion being in contact with the flange portion to cause the leading-end portion and the rotation prevention claw to hold the flange portion therebetween, wherein the rotation prevention claw includes a first claw portion and a second claw portion, and the first claw portion and the second claw portion are disposed away from each other in a direction orthogonal to the width direction of the carrier plate and a thickness direction of the carrier plate, and the leading-end portion of the elastic claw is disposed in a region between the first claw portion and the second claw portion.

2. The carrier plate according to claim 1, wherein the carrier plate is configured to include a region in which the rotation prevention claw and the elastic claw overlap with each other when viewed in the sliding direction.

3. The carrier plate according to claim 1, wherein the elastic claw and the rotation prevention claw are configured to form a gap smaller than an outer diameter of the cable.

4. The carrier plate according to claim 1, wherein the elastic claw extends in the width direction of the carrier plate.

5. The carrier plate according to claim 1, wherein the elastic claw extends in the sliding direction of the carrier plate.

6. The carrier plate according to claim 1, wherein a gap is provided between the elastic claw and the rotation prevention claw such that the cable does not intrude into the gap from a thickness direction of the carrier plate.

7. The carrier plate according to claim 1, wherein a gap provided between the elastic claw and the rotation prevention claw is a gap having a curved shape when viewed in a thickness direction of the carrier plate.

8. A window regulator, comprising:

a carrier plate;

a guide rail that guides the carrier plate, and includes:

a base portion;

an erected portion that is erected from the base portion and is connected to the base portion at one end of the erected portion; and a flange portion that is connected to another end of the erected portion;

a cable that transmits a driving force of a driving section to the carrier plate; and a direction-changing member provided in an end portion of the guide rail, wherein:

the carrier plate includes:

a base body;

a fitting portion that fits with the guide rail;

a rotation prevention claw that is provided on one side of the fitting portion in a width direction of the carrier plate, and prevents rotation of the carrier plate around the fitting portion with respect to the guide rail;

an accommodation portion that is provided on another side of the fitting portion in the width direction of the carrier plate, and accommodates an end portion of the cable; and an elastic claw that includes a leading-end portion located, in a case where the base body is viewed along a sliding direction of the carrier plate, in a position overlapping with the rotation prevention claw in a direction orthogonal to the sliding direction and the width direction of the carrier plate, the leading-end portion being in contact with the flange portion to cause the leading-end portion and the rotation prevention claw to hold the flange portion therebetween, wherein:

the rotation prevention claw extends from a side of a first surface of the flange portion to a side of a second surface of the flange portion, and is locked to the second surface, the side of the second surface being opposite to the first surface, and the elastic claw is in contact with the first surface; and the elastic claw and the rotation prevention claw are configured to form a gap smaller than an outer diameter of the cable.

* * * * *